W. C. STEVENS.
TIRE STRIPPING MACHINE.
APPLICATION FILED AUG. 24, 1916.
1,211,256.
Patented Jan. 2, 1917.
5 SHEETS—SHEET 5.
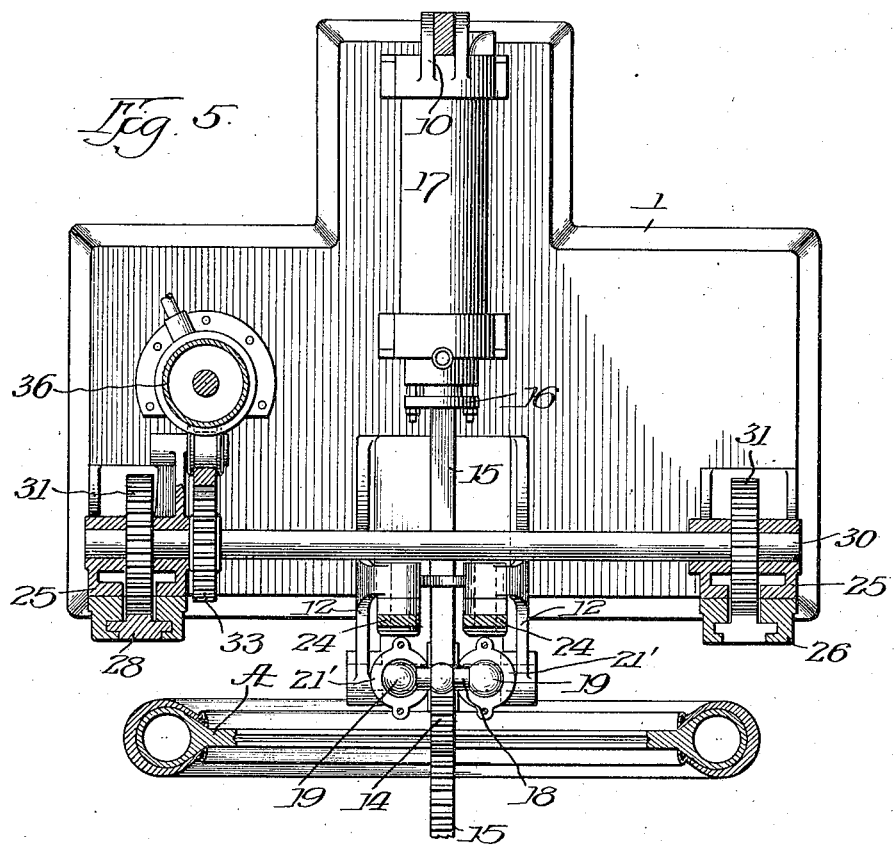
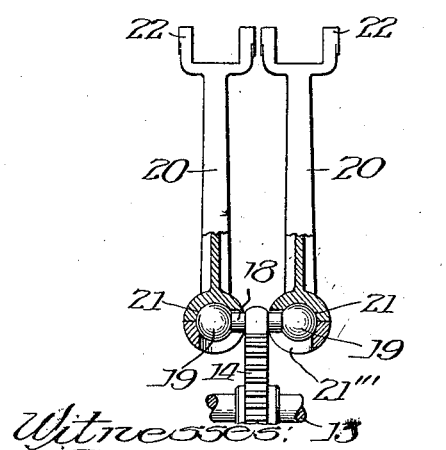
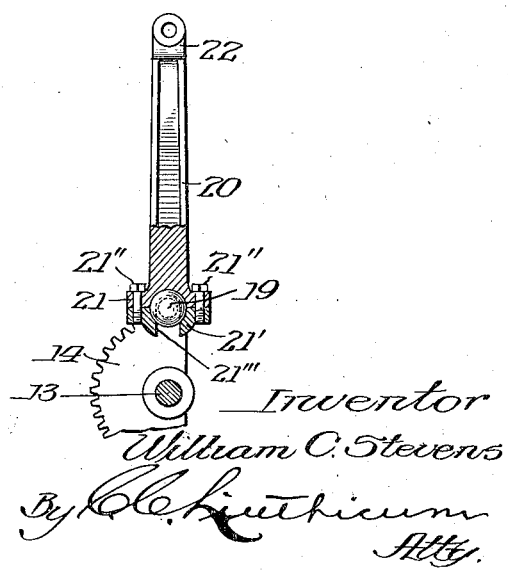
Inventor
William C. Stevens
By C. C. Linthicum
Atty.
Witnesses:
Fred C. Davison
G. L. Ely

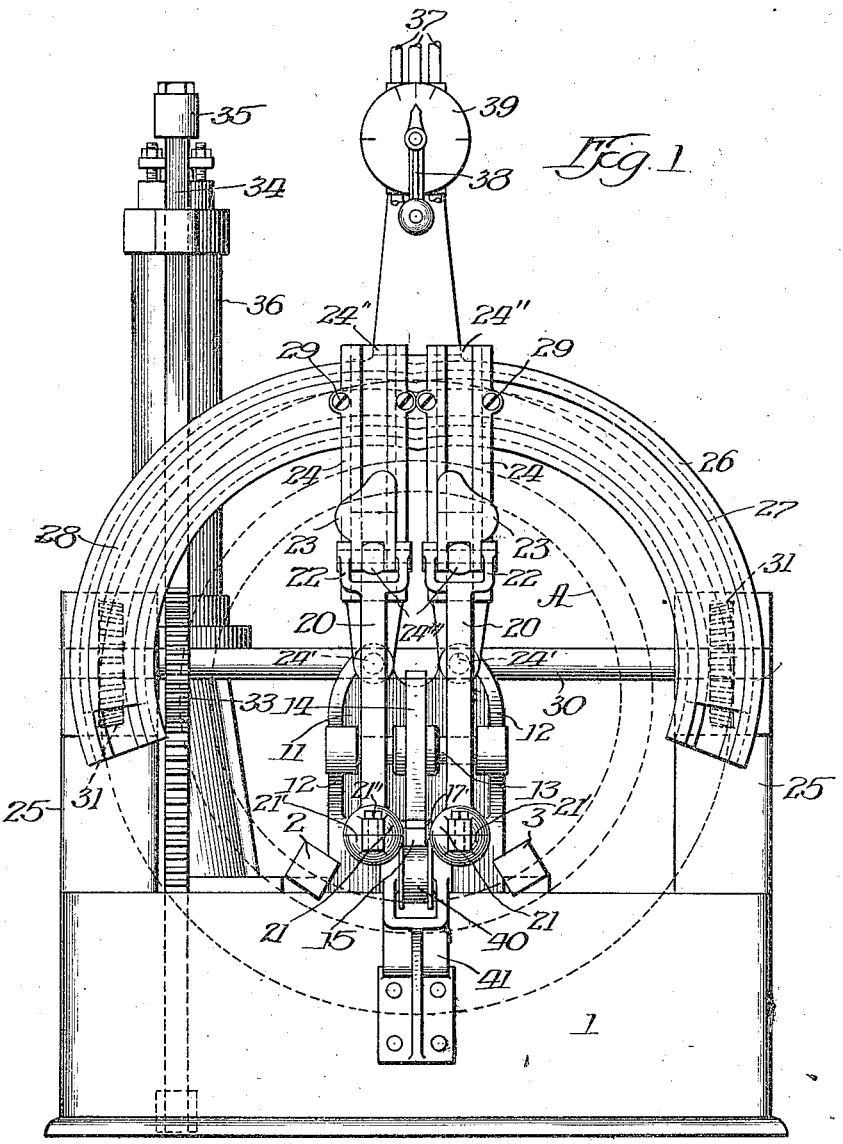

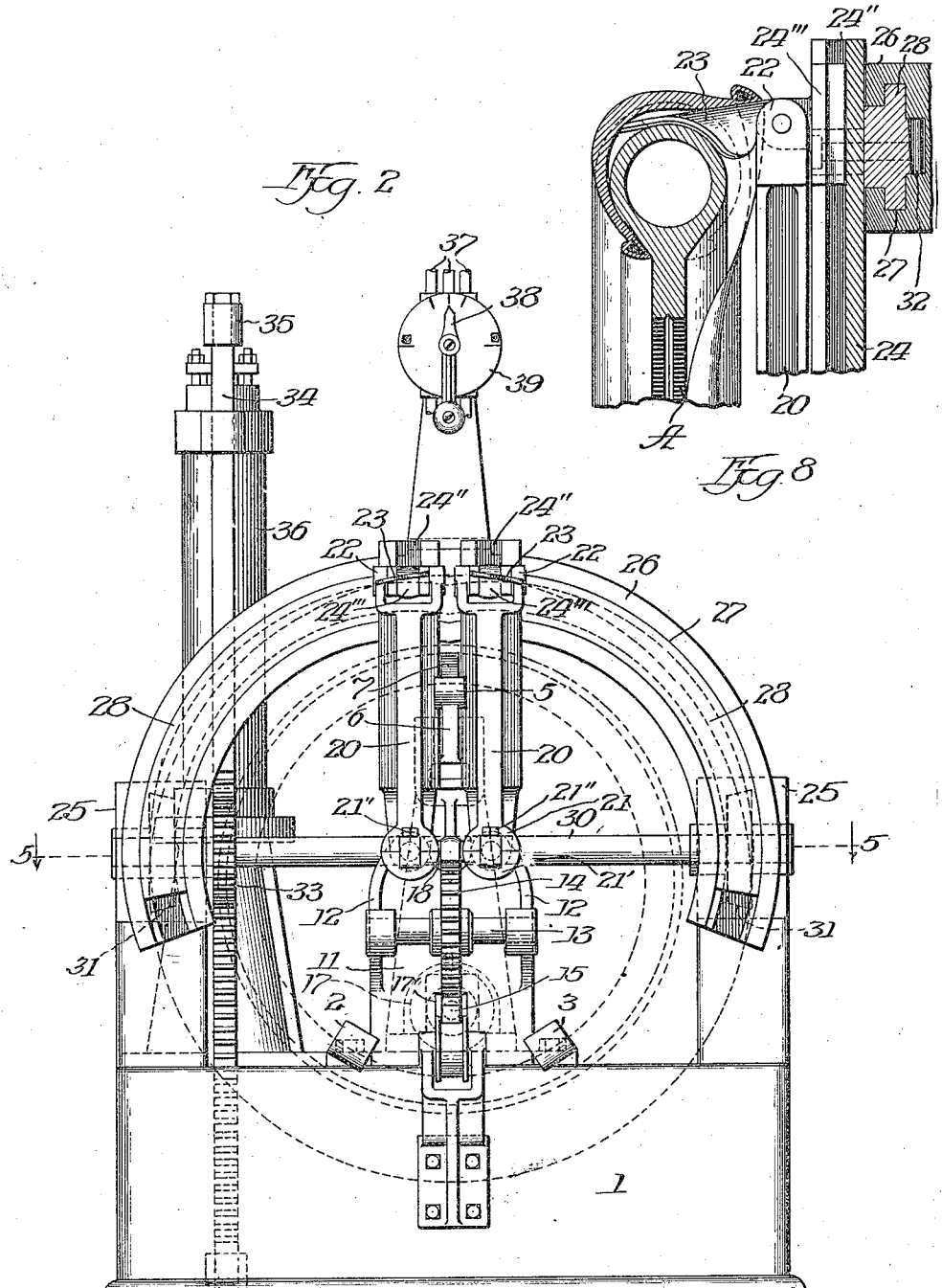

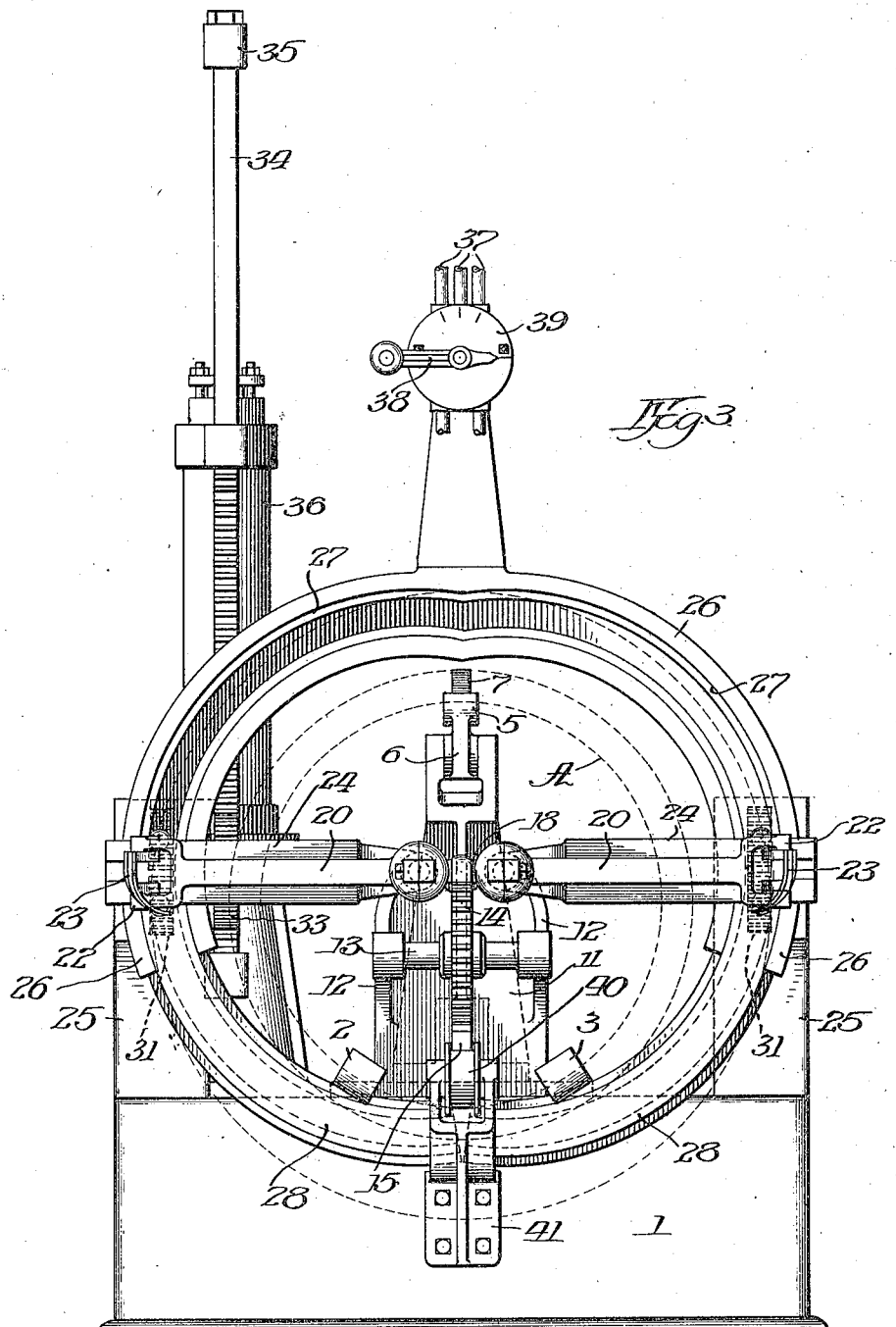

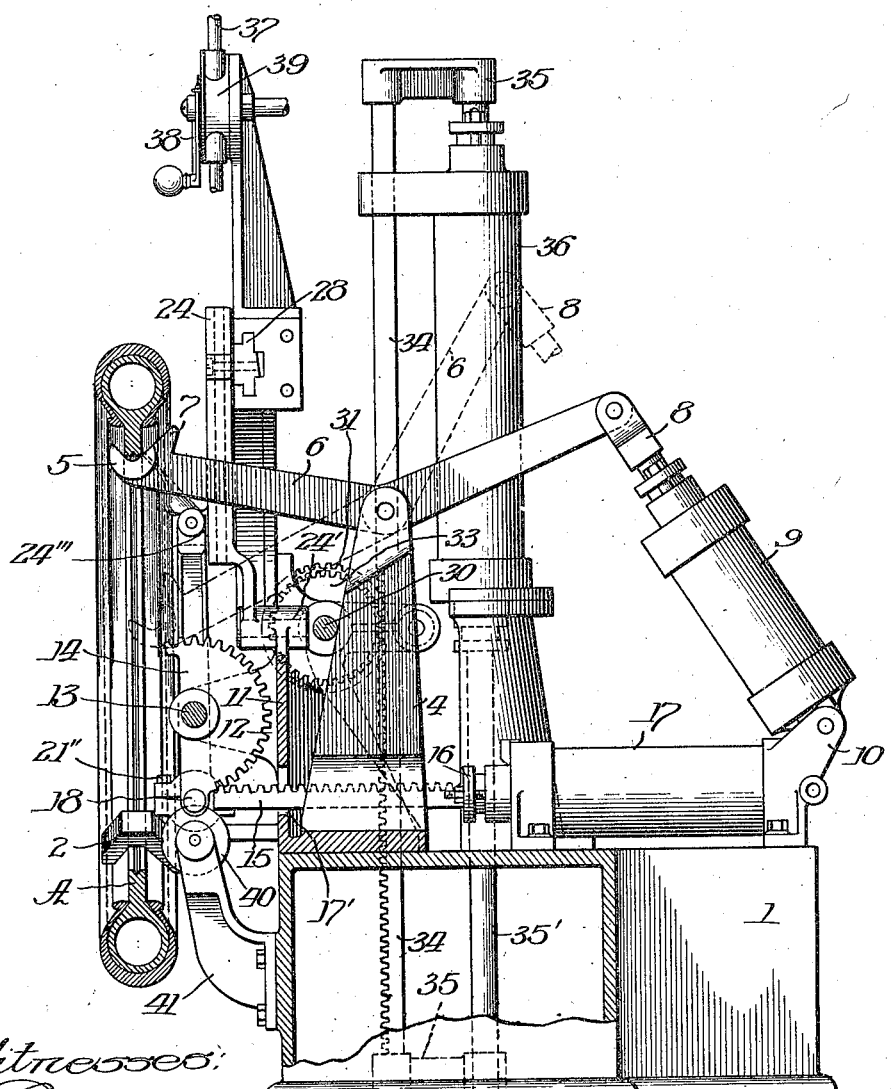

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

TIRE-STRIPPING MACHINE.

1,211,256.   Specification of Letters Patent.   Patented Jan. 2, 1917.

Application filed August 24, 1916. Serial No. 116,615.

*To all whom it may concern:*

Be it known that I, WILLIAM C. STEVENS, a citizen of the United States, residing in Akron, in the county of Summit and State of Ohio, have invented certain new and useful Improvements in Tire-Stripping Machines, of which the following is a specification.

In the manufacture of the type of tire which is known as a clencher tire, i. e. having an extensible bead, the tire is cured on a solid core from which it is stripped after vulcanization, by a workman having two hand tools which he uses to pry the tire up over the side of the core until it can be removed. The operation is a difficult one and takes considerable time. It has a further disadvantage, as, owing to the fact that the cores are hot when turned over to the tire stripper, a certain amount of time must be allowed for cooling, or the stripper is required to work on hot tires and cores to his great inconvenience.

By my machine I am enabled to dispense with the services of the trained stripper and to replace him, having devised a machine which will mechanically remove the tire from the core. This machine comprises a holder for the core and a pair of tools or strippers which are forced up under the tire and gradually brought around until it is stripped from the core.

In the drawings which accompany this specification, I show one embodiment of my machine in which:

Figure 1, is a front elevation of the machine, the arms being at the lowest point before the core is placed in the apparatus. Fig. 2, is a front elevation of the machine with the arms raised to the outer periphery of the core, the hands or stripper tools being shown in the position they occupy when stripping a tire, the core and tire being shown in dotted outlines. Fig. 3, is a third front view of the machine showing the arms in the position they occupy after the tire is stripped. Fig. 4, is a vertical longitudinal section through the center of the machine showing the tire and core in position. Fig. 5, is a horizontal section on the line 5—5 of Fig. 2. Fig. 6, is a detail view of the arms which carry the stripper fingers. Fig. 7, is a cross section of Fig. 6. Fig. 8, is a detail view showing one of the stripper fingers under the tire in the position to start the process of stripping.

In the drawings in which like reference numerals refer to like parts; 1 represents the base of the machine which is formed as a somewhat T-shaped inverted boxing on the upper surface of which are carried the various operating mechanisms for the machine. On the front face of the base 1, are carried horizontal brackets or holders 2 and 3, which are shown in V-shaped form at their extremities and are adapted to hold tire core A, with the aid of a third moving grip or clamp 5. On the upper surface of the base is formed a vertical standard 4, in the upper end of which is pivoted a rocking arm 6, having at its forward end an angular formation 7, carrying the tire core holder 5. The rear end of the arm 6 is pivoted to the plunger 8, of a pneumatic cylinder 9, which is in turn pivoted on a bracket 10 at the rear of the base. The tire core carrying a vulcanized tire in condition to be stripped is held between the arms 2, 3, and 5, when the pneumatic cylinder 9 is charged. When the cylinder is exhausted the arm 6 will occupy the position shown in dotted lines in Fig. 4, whereupon a core from which a tire has been stripped may be removed and another placed thereon. A core having been hung on the end of the arm 6 in its lowermost position, fluid pressure is introduced into the cylinder 9, and the arm assumes its horizontal position, whereupon the core will be firmly clamped and is ready to be operated on by the stripper fingers.

The base of the bracket is formed with an integral vertical web 11, from which extend a pair of parallel brackets 12, in the outer ends of which is rotatably mounted a shaft 13, carrying a semi-circular gear segment 14, the teeth of which are in mesh with a rack 15, carried by a plunger 16, of a second fluid operated cylinder 17, the rack reciprocating through an opening 17' in the web 11. The extremity of the gear segment which is lowermost when the rack is withdrawn carries a pin 18 on the ends of which are formed spherical enlargements 19. Each of these enlargements form the ball of a ball-socket joint, the socket of which is carried on arm 20, the lower end of which is formed as a socket 21, covered by a cap 21' held by screws 21''. Slots 21''' are formed in the caps so as to permit a movement in a quarter of a circle about the socket 21.

The upper ends of the arms 20 are formed with yokes 22, in which are pivotally mounted the tire removing members or tools 23, which are shown more in detail in Fig. 8, and consist of a curved tapering plate. Directly back of each arm 20 there is positioned a directing or swinging arm 24, which is pivoted to the upper edge of the web 11, at 24', the front face of each arm 24 being formed with a groove or guideway 24'', in which is received a shoe 24''' mounted on the arm 20 directly back of the tire removing tool.

On the forward corners of the base 1, are secured standards 25 which serve as a support for an arched track or guideway by which the arms 24, and through them the arms 20, are guided for their sweep about the core in removing the tire. To the front face of the upright 25, is secured the almost semi-circular track-way 26, which is formed in two arcs intersecting over the center of the core, each arc being the quarter section of a circle gradually diverging from the periphery of the core. The front face of the arch 26 is formed with rabbeted guideways 27, in which are received quarter circle racks 28 secured at their upper ends to the rear face of each arm 24 by screws 29. Rotatably mounted in the standards 25, is a transverse shaft 30, which carries two bevel gear wheels 31, one in each standard 25 and extending toward the arch 26, as shown in Fig. 5. These gears mesh with gear teeth 32 on the rear face of the racks 28. A drive pinion 33 is formed on the shaft 30 and is arranged to mesh with a vertical rack 34, carried by brackets 35, at each end of a plunger rod 35' of an upright fluid actuated cylinder 36.

The cylinders 9, 17, and 36, are all arranged to be operated by fluid pressure, preferably compressed air, through a system of piping 37, which is controlled by a multiple-way valve 38, of any preferred construction having a handle and pointer running over a disk 39, convenient to the operator of the machine.

The operation of the machine is as follows: A core with a tire having been removed from the heater and removed from the mold and unwrapped is placed on the end of the arm 6, which is a position in dotted lines in Fig. 4. The valve 38 is turned to proper position to introduce the air to the cylinder 9, whereupon the arm will rise to the position shown in full lines and the core will be clamped between the points 5, and 2 and 3. The valve is now opened to the next point and the cylinder 17 is charged, whereupon the rack 15 will advance, rotating the gear segment 14. A roller 40 carried on a bracket 41 serves to support the rack under the gear segment. This will cause the arms 20 to rise in parallelism, tire removing fingers or tools 23 advancing up along the side of the tire core 5 and under the tire beads. The arms will rise to the position shown in Fig. 2, with the pivots about at a level with the upper surface of the core, whereupon both arms will be found underneath the tire, raising the bead at one side to the position shown in Fig. 8. With the cylinder 17 still maintained charged with air the valve is opened still farther and pressure passes into the cylinder 36, whereupon the rack 34 will rise, rotating the shaft 30 and through the bevel pinions, the gears 31, and the arc-shaped racks are pulled downward to the position shown in Fig. 3. This causes the arms to be brought down, being guided by the shoes in the guideways formed on the face of the arch. As the center of the arch is above the center of the core, the path of the tire removing tools will diverge from the periphery of the core and the tire removing tools will be slowly tilted downwardly. The downward movement of the tools combined with the tilting serve to gradually peel off the tire from the core, which will drop from the core when the arms are in the position shown in Fig. 3, or before they reach the downward limit of movement. The arms are now brought back by a reversal of the air cylinders until they occupy position shown in Fig. 1, whereupon the core may be removed and a new one placed thereon.

It is obvious that various changes and modifications may be made in the machine as shown without departing from the spirit of the invention or sacrificing any of its benefits.

Claims:

1. Apparatus for removing tires from cores, comprising a support for a core, a tire removing member, and means to operate said member to remove the tire from the core.

2. Apparatus for removing tires from cores, comprising a support for a core, a tire removing tool, adapted to rest against the surface of the core, and means to pass the tool over the surface of the core to remove the tire.

3. Apparatus for removing tires from cores, comprising a support for a core, a tire removing tool adapted to rest against the surface of the core below the bead of the tire and means to project the tool radially over the surface of the core.

4. Apparatus for removing tires from cores, comprising a support for a core, a tire removing tool adapted to rest against the surface of the core below the bead of the tire and means to project the tool radially over the surface of the core, and means to pass said tool around the periphery of the core.

5. Apparatus for removing tires from cores, comprising a support for a core, a tire removing tool, and means to pass the tool around the periphery of the core.

6. Apparatus for removing tires from cores, comprising a support for a core, a rocking arm, a tire removing tool on said arm and means to rock said arm, whereby the tool is passed over the periphery of the core.

7. Apparatus for removing tires from cores, comprising a support for a core, an arm, a tire removing tool on said arm, means for advancing said arm radially of the core, and bringing it around the periphery thereof, whereby the tool is passed over the periphery of the core.

8. Apparatus for removing tires from cores, comprising a support for a core, an arm, a tire removing tool pivoted on said arm and adapted to rest on the surface of the core, means for moving said arm radially of the core, and means for bringing it around the periphery thereof.

9. Apparatus for removing tires from cores, comprising a support for a core, a pivoted arm, a tire removing tool on the end of said arm, and means for rocking the arm on the pivot, the path of said tool diverging from the periphery of the core.

10. Apparatus for removing tires from cores, comprising a support for a core, a pivoted arm, means to move the pivot of the arm radially of the core, a tire removing tool on the end of said arm, and means for rocking the arm on the pivot, the path of said tool diverging from the periphery of the core.

11. Apparatus for removing tires from cores, comprising a support for a core, a pivoted arm, means to move the pivot of the arm radially of the core, a tapered tire removing tool pivoted on the end of said arm, the tapered end resting on a core in position, and means for rocking the arm on its pivot, the path of the end of the arm diverging from the periphery of the core.

12. An apparatus for removing tires from cores, comprising means for holding a core, a tire stripping tool, and means to move said tool in an arc diverging from the periphery of the core.

13. An apparatus for removing tires from cores, comprising the combination of a core holder, two tire stripping tools, and means to separate said stripping tools.

14. In an apparatus for removing tires from cores, the combination of a core holder, two tire stripping tools, means to advance said tools radially of the core and means to pass the tools around the periphery of the core.

15. In an apparatus for removing tires from cores, the combination of a core, holders therefor, two tire stripping tools, means to advance said tools radially of the core, in parallelism, and means to separate said tools about the periphery of the core.

16. In an apparatus for removing tires from cores, the combination of a core holder, two pivoted arms, a common support for said arms, means to move said support radially of the core, means to hold said arms in parallelism while the support is moving radially and to separate said arms, and a tire removing tool on the end of each arm.

17. In an apparatus for removing tires from cores, the combination of a core holder, two pivoted arms, a common support for said arms, means to move said support radially of the core, an arc shaped guideway at the rear of said core holder, a sleeve connected to each said arm adapted to travel in the guideway, a tire removing tool on the end of each arm, and means to rock said arms on their respective pivots.

WILLIAM C. STEVENS.

Witness:
  A. L. ELY.

Copies of this patent may be obtained for five cents each, by addressing the "Commissioner of Patents. Washington, D. C."